MAGNETIC CORE GATING CIRCUITS

Filed Aug. 28, 1961 2 Sheets-Sheet 1

INVENTOR
DONALD F. BUSCH
BY [signature]
AGENT

United States Patent Office 3,267,441

Patented August 16, 1966

3,267,441

MAGNETIC CORE GATING CIRCUITS

Donald F. Busch, Vestal, N.Y., assignor to International Business Machines Corporation, New York, N.Y., a corporation of New York Filed Aug. 28, 1961, Ser. No. 134,298
7 Claims. (Cl. 340—174)

This invention relates to magnetic core gating circuits and more particularly to the storage and transmission of electrical energy to be utilized in computing operations or in data processing apparatus for controlling functional sequences.

The invention is characterized by the application to bistable elements of state controlling circuitry functioning to produce predetermined patterns of control pulses applicable to data processing apparatus. In switching circuitry it is often necessary to gate a single line out of several lines. Gating can be accomplished by connecting the line to be gated with a given voltage while maintaining the other lines at a higher or lower voltage.

The invention resides in a device that may include a plurality of stages, each stage having a core of ferromagnetic material having high magnetic retentivity and a relatively open hysteresis loop of nearly rectangular shape, so that when such a core is magnetized to a state of flux saturation of one polarity, it tends to remain in such state until the direction of flux saturation is reversed, as by application of a flux-reversing force in the form of a pulse of current delivered to a winding carried by the core. To this known arrangement the present invention adds the concept of transistorized gating circuits controlled by a shift register, and buffering for the core output in the control circuitry with means to restore the register to the same state or to advance the shift register to a new state. This type of magnetic core gating circuit has certain advantages, particularly in computer circuits and data processing circuits designed for the solution of logical problems, which will be discussed more fully in the subsequent description of the details of the invention.

Accordingly, the present invention has as a primary object the combining of a single core per bit magnetic shift register with a transistorized control circuit to provide a novel magnetic core gating circuit.

Another object of the invention is to provide an improved one core per bit shift register having negligible power losses.

A further object of the invention is to provide a novel circuit employing a storage device adapted to control the regeneration and shifting of a magnetic shift register.

A still further object of the present invention is to increase the reliability, reduce the weight and size of equipment, enhance the efficiency and provide a more economical apparatus adapted to circuit gating functions.

The foregoing and other objects, features and advantages of the invention will be apparent from the following more particular description of preferred embodiments of the invention, as illustrated in the accompanying drawings.

Figure 3:
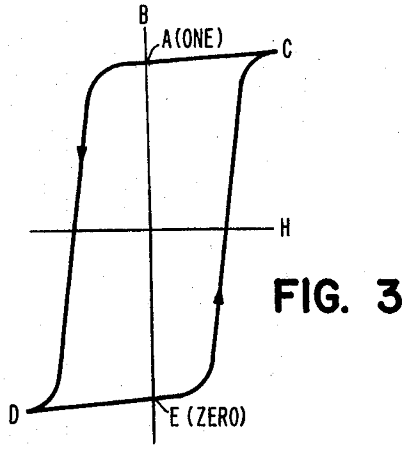
FIG. 3 is an idealized showing of the rectangular hysteresis loop characteristics of the magnetic core material such as is used in this invention.

The curve in FIG. 3 illustrates an idealized hysteresis loop of commercially obtainable magnetic material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C and, upon relation of this positive force, revert to point A. Application of a negative magnetomotive force greater than the coercive force causes the curve to be traversed to point D, and when the force is terminated, traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated. The state of remanence indicated at point A on the curve has been arbitrarily selected as representing a "1" and the state of remanence indicated at point E has a "0." In order to indicate how the turns of a winding are placed on a core, the dot convention is employed to indicate that current flowing out of a winding from a dot-marked end is arbitrarily assumed to produce a counterclockwise flux in the core. Stated otherwise, the core is switched in a positive direction. Current flowing into a winding at a dot-marked end then produces a clockwise flux in the core. Stated otherwise, the core is switched in a negative direction.

Figure 1:
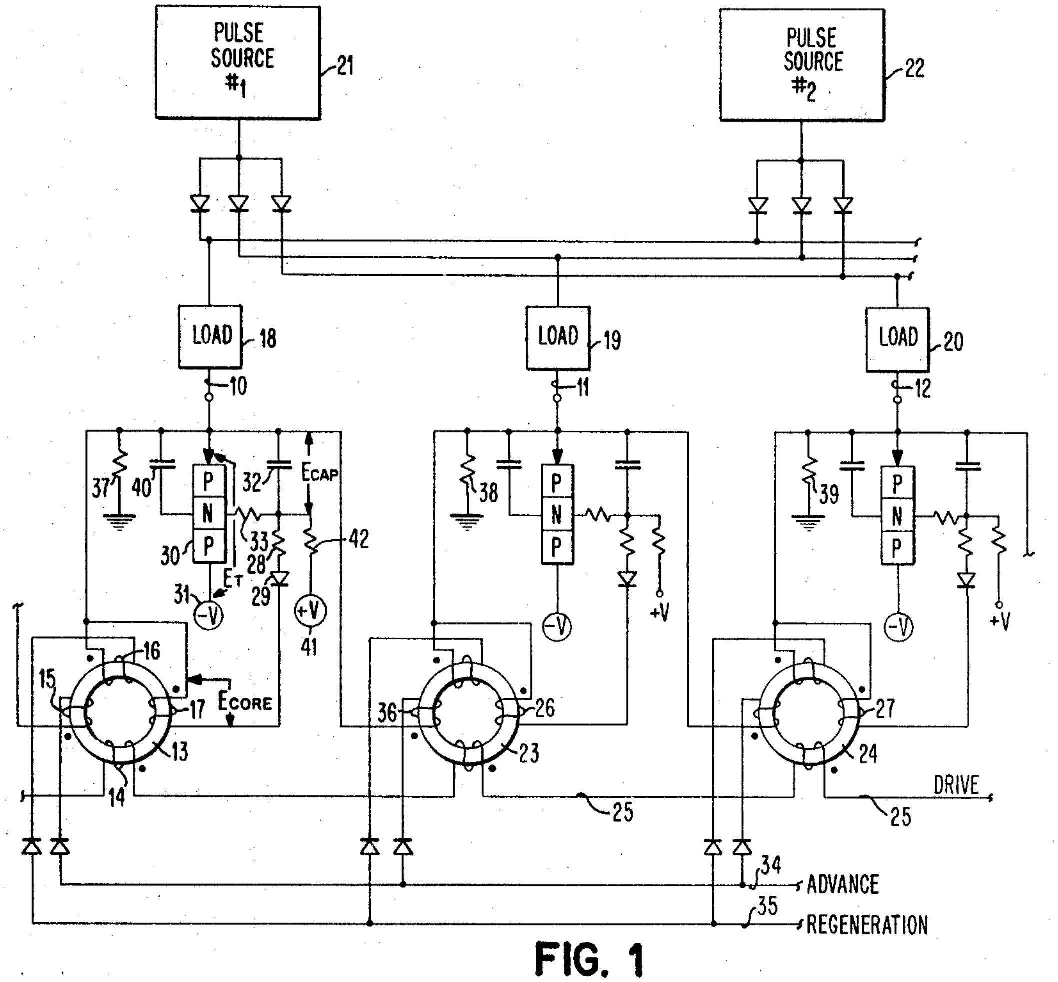
FIG. 1 is an electrical schematic diagram of a circuit embodying the principles of the present invention.

Reference is made to FIG. 1 for a description of the magnetic core gating circuit constructed according to the principles of the present invention. As shown, the magnetic core gating circuits comprise three stages tied together for controlling three lines 10, 11 and 12 which are adapted to be selectively gated. While only 3 lines are shown, it is by no means intended that the circuitry be limited to this quantity of lines. The first stage of the gating circuitry comprises a magnetic core 13 having a drive winding 14, an advance winding 15, a regeneration winding 16, an output winding 17, and the associated transistorized control circuitry for line 10 which will be subsequently described more fully. Each of the lines 10, 11 and 12 are connected with their respective loads 18, 19 and 20 which in turn may be electrically connected with one or more pulse sources, as for example, 21 and 22.

Normally the transistor 30 is biased to an "off" condition by the potential supplied from voltage source 41 and applied to the base of transistor 30 by way of resistors 42 and 33. Normally there will be no current flow in the transistor collector of this circuit.

Figure 4:
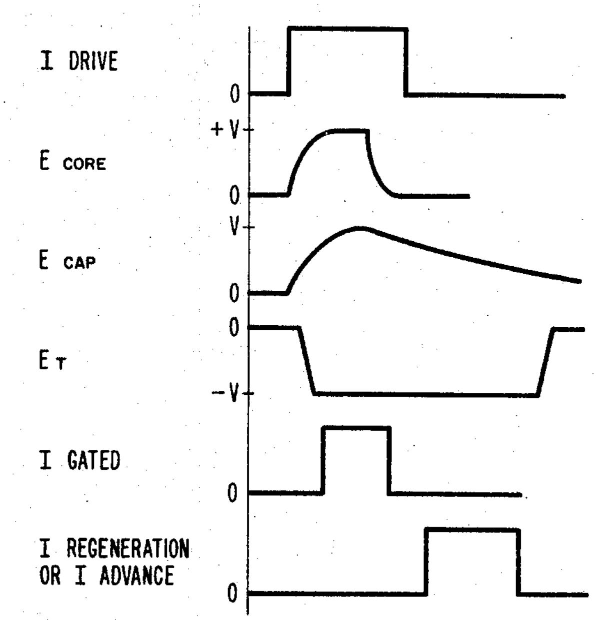
FIG. 4 is a pulse-time diagram for aiding in the understanding of the operation of the embodiment of FIG. 1.

A line to be gated is controlled by the turning "on" of a transistor or by rendering the transistor conductive and selected under the control of a magnetic core being in the "1" state of remanence. For purposes of illustration we may assume magnetic core 13 to be in the "1" state while cores 23 and 24 are in the "0" state. With reference to FIGS. 1 and 4, the application of a current drive pulse to the drive line 25 will attempt to switch magnetic cores 13, 23 and 24 to the "0" state but only magnetic core 13 will switch from the "1" state to the "0" state thereby causing a voltage to be induced in the output winding 17 while a negligible voltage is induced in the output windings 26 and 27 since magnetic cores 23 and 24 are already in the "0" state. The resulting voltage induced in the output winding 17 establishes a main current flow through the resistors 33 and 28 and the diode 29 which serves to overcome the bias for transistor 30 and renders it conductive. Line 10, which is normally at ground potential, will drop substantially towards the negative voltage of voltage supply 31 due to the conduction of transistor 30. Simultaneously, the current flow in the capacitor 32 caused by winding 17 will serve to charge it. The start and termination of the gated pulse is controlled selectively by pulse source 21 or 22.

When the magnetic core 13 completes its switching, which may be due to either the saturation of the magnetic core 13 or the termination of the drive pulse applied to the drive line 25, the capacitor 32 will maintain the transistor 30 in the "on" condition and will discharge through the resistor 33 and the base to emitter of transistor 30. The transistor 30 will remain "on" for a period of time depending mainly on the time constant of capacitor 32 and resistor 33.

During the period that the transistor 30 is maintained "on" by the capacitor 32, either the advance line 34 or the regeneration line 35 will be pulsed depending upon whether it is desirous to regenerate magnetic core 13 or advance to the magnetic core 23. If the regeneration line 35 is pulsed, current will flow through the regeneration winding 16 of magnetic core 13 and the "on" transistor to the negative voltage supply 31. The current flow through winding 16 causes magnetic core 13 to switch to the "1" state of remanence. Thusly, the previously selected magnetic core 13 is reset to the "1" state and will be selected again by the next drive pulse applied to the drive line 25.

If the advance line 34 is pulsed, current will flow through the advance winding 36 of magnetic core 23 and the "on" transistor 30 to the negative voltage supply 31. The current flow through winding 36 causes magnetic core 23 to switch to the "1" state. Thus, line 11 will be in readiness to be gated by the next occurring drive pulse applied to the drive line 25.

Normally the lines 10, 11 and 12 are held at ground potential by means of resistors 37, 38 and 39. Capacitor 40 functions as a noise suppression device.

Optionally, the transistor of the last stage may be coupled with the advance winding 15 of the first stage to form a closed gating circuit or it may be left in an open condition. When the gating circuit is in an open condition it operates as an open ring and gating will occur only after the first magnetic core has been set to a "1" state by an outside source and will cease to operate when the "1" state is advanced from the last core in the circuit. This has utility in some systems since it allows additional control over the gating process.

Figure 2:
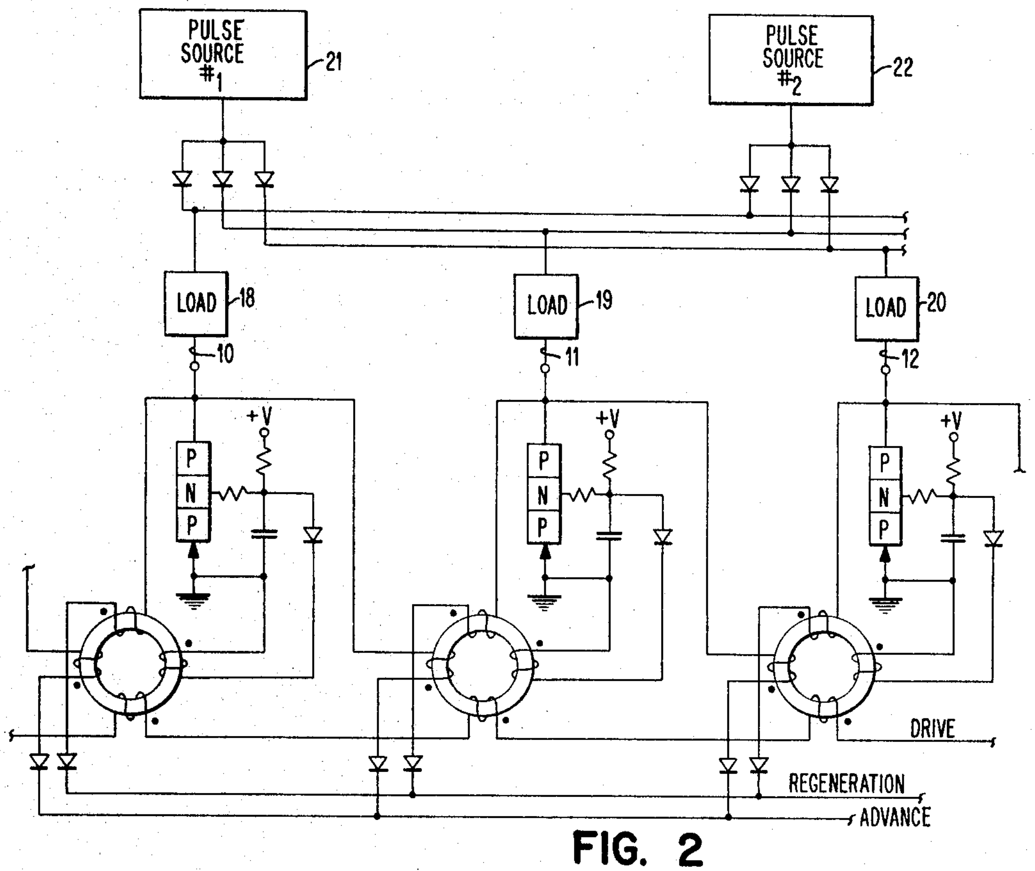
FIG. 2 is an electrical schematic diagram of an alternative circuit embodying the principles of the invention.

FIG. 2 is a variation of the gating circuit shown in FIG. 1 to provide an opposite voltage shift but the operation is basically the same. It is to be further noted that although PNP transistors have been shown, the circuits can be made to operate equally as well using NPN transistors.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A signal control system comprising a plurality of signal lines adapted to be selectively gated; a magnetic core register having a plurality of bistable magnetic cores one for each of said signal lines and having two stable states of magnetic remanence, a drive winding, an advance winding, a regeneration winding, and an output winding all inductively coupled to each of said cores; a potential source; a plurality of transistors, one coupled with each of said signal lines for selectively connecting a signal line with said potential source; means for normally biasing each of said transistors to a nonconductive condition; means coupling the biasing means for each transistor with the output winding of its respective core; means for selectively applying a current pulse to one of said drive windings for switching a selected core from a reference stable state to its other stable state whereby the induced current in the output winding of said selected core serves to overcome the biasing means for the associated transistor for rendering the transistor conductive to thereby apply a gating potential to the signal line associated with the selected core; an energy storing element coupled with said biasing means and serving to store an energy charge during the switching of said core for maintaining said conducting transistor conductive for a predetermined time interval after the termination of said current pulse to said drive winding connecting means; and means for optionally applying a current pulse to the regeneration winding or advance winding on said core during the predetermined time interval that said transistor is maintained conductive for restorably switching said selected core to its reference state of remanence or for switching the next succeeding core to its reference state of remanence.

2. A signal control system comprising a plurality of signal lines adapted to be selectively gated; a magnetic core register having a plurality of bistable magnetic cores one for each of said signal lines and having two stable states of magnetic remanence, a drive winding, a regeneration winding, and an output winding all inductively coupled to each of said cores; a potential source; a plurality of transistors, one coupled with each of said signal lines for selectively connecting it with said potential source; means for normally biasing each of said transistors to a nonconductive condition; means connecting the drive windings of said cores in a series circuit; means coupling the biasing means for each transistor with the output winding of its respective core; means for applying a current pulse to said drive winding connecting means for switching a selected core from a predetermined stable state to its other stable state whereby the induced current in the output winding of said selected core serves to overcome the biasing means for the associated transistor for rendering the transistor conductive to thereby apply a gating potential to the signal line associated with the selected core; an energy storing element coupled with said biasing means and serving to store an energy charge during the switching of said core for maintaining said conducting transistor conductive for a predetermined time interval after the termination of said current pulse to said drive winding connecting means; and means for applying a current pulse to the regeneration winding on said core during the predetermined time interval that said transistor is maintained conductive for restorably switching said selected core to its original state of remanence.

3. A signal control system comprising a plurality of signal lines adapted to be selectively gated; a magnetic core register having a plurality of bistable magnetic cores one for each of said signal lines and having two stable states of magnetic remanence, a drive winding, an advance winding, and an output winding all inductively coupled to each of said cores; a potential source; a plurality of transistors, one coupled with each of said signal lines for selectively connecting it with said potential source; means for normally biasing each of said transistors to a nonconductive condition; means connecting the drive windings of said cores in a series circuit; means coupling the biasing means for each transistor with the output winding of its respective core; means for applying a current pulse to said drive winding connecting means for switching a selected core from a predetermined stable state to its other stable state whereby the induced current in the output winding of said selected core serves to overcome the biasing means for the associated transistor for rendering the transistor conductive to thereby apply a gating potential to the signal line associated with the selected core; an energy storing element coupled with said biasing means and serving to store an energy charge during the switching of said core for maintaining said conducting transistor conductive for a predetermined time interval after the termination of said current pulse to said drive winding connecting means; and means for applying a current pulse to the advance winding on said core during the predetermined time interval that said transistor is maintained conductive for switching the state of remanence of the next succeeding core.

4. A signal control system comprising a plurality of signal lines adapted to be selectively gated; a magnetic core register having a plurality of bistable magnetic cores one for each of said signal lines having two stable states of magnetic remanence, a drive winding, an advance winding, a regeneration winding, and an output winding all inductively coupled to each of said cores; a potential source; a plurality of transistors, one coupled with each of said signal lines for selectively connecting it with said potential source; means for normally biasing each of said transistors to a nonconductive condition; means connecting the drive windings of said cores in a series circuit; means coupling the biasing means for each transistor with the output winding of its respective core; means for applying a current pulse to said drive winding connecting means for switching a selected core from a predetermined stable state to its other stable state whereby the induced current in the output winding of said selected core serves to overcome the biasing means for the associated transistor for rendering the transistor conductive to thereby apply a gating potential to the signal line associated with the selected core; an energy storing element coupled with said biasing means and serving to store an energy charge during the switching of said core for maintaining said conducting transistor conductive for a predetermined time interval after the termination of said current pulse to said drive winding connecting means; and means for optionally applying a current pulse to the regeneration winding or advance winding of said core during the predetermined time interval that said transistor is maintained conductive for restorably switching said selected core to its original state of remanence or for switching the state of remanence of the next succeeding core.

5. A signal control system comprising a plurality of signal lines adapted to be selectively gated; a magnetic core register having a plurality of bistable magnetic cores one for each of said signal lines and having two stable states of magnetic remanence; a drive winding, an advance winding, a regeneration winding, and an output winding inductively coupled to each of said cores; a potential source; a plurality of transistors, one coupled with each of said signal lines for selectively connecting the signal line with said potential source; a biasing circuit for each of said transistors including resistive elements, a diode and the output winding for the respective transistor and coupled with a biasing potential which serves to normally maintain said transistors nonconducting; means connecting said drive windings of said cores in series circuit; means connecting the regeneration winding for each core with its respective signal line; means connecting each signal line with the advance winding of the next succeeding core; means for applying a current pulse to said drive winding connecting means for switching a selected core from a reference stable state to its other stable state the induced current in the output winding of said selected core serving to overcome the biasing potential for the associated transistor and rendering said associated transistor conductive to thereby apply a gating potential to the signal line associated with the selected core; a capacitor capable of storing electrical energy connected between the biasing circuit for each transistor and its respective signal line and serving to store an energy charge during the switching of the selected core for the purpose of maintaining its associated transistor conductive for a predetermined time interval after the termination of the current pulse to the drive winding connecting means; and selective means for optionally applying a current pulse to either the regeneration winding for the selected core or the advance winding for the next succeeding core during the predetermined time interval that the selected transistor is maintained conductive for restorably switching said selected core to its reference state or for switching the next succeeding core to its reference state.

6. A signal control system comprising a plurality of signal lines adapted to be selectively gated; a magnetic core register having a plurality of bistable magnetic cores one for each of said signal lines and having two stable states of magnetic remanence; a drive winding, an advance winding, a regeneration winding, and an output winding inductively coupled to each of said cores; a potential source; a plurality of transistors, one coupled with each of said signal lines for selectively connecting the signal line with said potential source; a biasing circuit for each of said transistors including the output winding for the respective transistor and coupled with a biasing potential which serves to normally maintain said transistors nonconductive; means connecting said drive windings of said cores in series circuit; means connecting the regeneration winding for each core with its respective signal line; means connecting each signal line with the advance winding of the next succeeding core; means for applying a current pulse to said drive winding connecting means for switching a selected core from a reference stable state to its other stable state the induced current in the output winding of said selected core serving to overcome the biasing potential for the associated transistor and rendering said associated transistor conductive to thereby apply a gating potential to the signal line associated with the selected core; a capacitor capable of storing electrical energy connected between the biasing circuit for each transistor and its respective signal line and serving to store an energy charge during the switching of the selected core for the purpose of maintaining its associated transistor conductive for a predetermined time interval after the termination of the current pulse to the drive winding connecting means; and selective means for applying a current pulse to the regeneration winding for the selected core during the predetermined time interval that the selected transistor is maintained conductive for restorably switching said selected core to its reference state.

7. A signal control system comprising a plurality of signal lines adapted to be selectively gated; a magnetic core register having a plurality of bistable magnetic cores one for each of said signal lines and having two stable states of magnetic remanence; a drive winding, an advance winding, a regeneration winding, and an output winding inductively coupled to each of said cores; a potential source; a plurality of transistors, one coupled with each of said signal lines for selectively connecting the signal line with said potential source; a biasing circuit for each of said transistors including the output winding for the respective transistor and coupled with a biasing potential which serves to normally maintain said transistors nonconductive; means connecting said drive windings of said cores in series circuit; means connecting the regeneration winding for each core with its respective signal line; means connecting each signal line with the advance winding of the next succeeding core; means for applying a current pulse to said drive winding connecting means for switching a selected core from a reference stable state to its other stable state the induced current in the output winding of said selected core serving to overcome the biasing potential for the associated transistor and rendering said associated transistor conductive to thereby apply a gating potential to the signal line associated with the selected core; a capacitor capable of storing electrical energy connected between the biasing circuit for each transistor and its respective signal line and serving to store an energy charge during the switching of the selected core for the purpose of maintaining its associated transistor conductive for a predetermined time interval after the termination of the current pulse to the drive winding connecting means; and selective means for applying a current pulse to the advance winding for the next succeeding core during the predetermined time interval that the selected transistor is maintained conductive for switching the next succeeding core to its reference state.

References Cited by the Examiner

UNITED STATES PATENTS

| | | | |
|---|---|---|---|
| 2,846,669 | 8/1958 | McMillan | 340—174 |
| 2,902,609 | 9/1959 | Ostroff | 340—174 |
| 2,955,264 | 10/1960 | Kihn | 340—174 |
| 3,053,992 | 9/1962 | Todman | 307—88 |
| 3,063,038 | 11/1962 | Davis | 340—174 |
| 3,124,786 | 3/1964 | Grandstaff | 340—174 |

BERNARD KONICK, *Primary Examiner.*

IRVING SRAGOW, *Examiner.*

R. J. McCLOSKEY, M. S. GITTES, *Assistant Examiners.*